United States Patent [19]
Arnold

[11] Patent Number: 5,186,074
[45] Date of Patent: Feb. 16, 1993

[54] BICYCLE HANDLEBAR SHOCK ABSORBER

[76] Inventor: John R. Arnold, 905 SW. Cedar Hills Blvd., Apt. 1122, Portland, Oreg. 97225

[21] Appl. No.: 801,418

[22] Filed: Dec. 2, 1991

[51] Int. Cl.[5] ............................................. B62K 21/14
[52] U.S. Cl. .................................. 74/551.2; 74/551.1; 188/319; 280/276
[58] Field of Search ................. 74/551.2, 551.1, 551.4; 280/276, 282, 288.4, 780; 188/319, 312

[56] References Cited

U.S. PATENT DOCUMENTS

| | | | |
|---|---|---|---|
| 583,483 | 6/1897 | Kellogg | 74/551.2 |
| 1,060,442 | 4/1913 | Erickson | 74/551.2 |
| 1,183,389 | 5/1916 | MacLean | 74/551.2 |
| 1,306,016 | 6/1919 | MacLean | 74/551.2 |
| 1,468,835 | 9/1923 | Rosen | 74/551.2 |
| 1,616,021 | 2/1927 | Arzens | 74/551.2 |
| 1,640,454 | 8/1927 | Kuhn | 74/551.2 |
| 2,324,403 | 7/1943 | Kuhn | 74/551.2 |
| 4,420,989 | 12/1983 | Finkle | 74/551.2 |

FOREIGN PATENT DOCUMENTS 13837 of 1911 United Kingdom .

OTHER PUBLICATIONS

Article entitled "Bicycle Suspensions" (Bicycle Guide, Aug. 1988, pp. 75–79).

*Primary Examiner*—Richard Lorence
*Assistant Examiner*—Andrea Pitts

[57] ABSTRACT

A handlebar shock absorber for bicycles and the like comprises two pivotably coupled support members, one of which attaches to the bicycle handlebars while the other attaches to the steering fork. An offset link is pivotably mounted to one of the members so as to slidably engage the other member. A compression spring extends along the link and urges the handlebar support member to an upper, rest position. Shocks transmitted along the front fork of the bicycle are resiliently absorbed by rotation of the handlebar mounting member against the compression spring. The degree of compression of the spring may be changed for different riding courses. A hydraulic piston/cylinder combination coupled to the offset link adds to the shock absorbing capability of the device. A metering rod is adjustable in a piston orifice to enable a rider to adjust the shock absorber stiffness without dismounting.

17 Claims, 8 Drawing Sheets

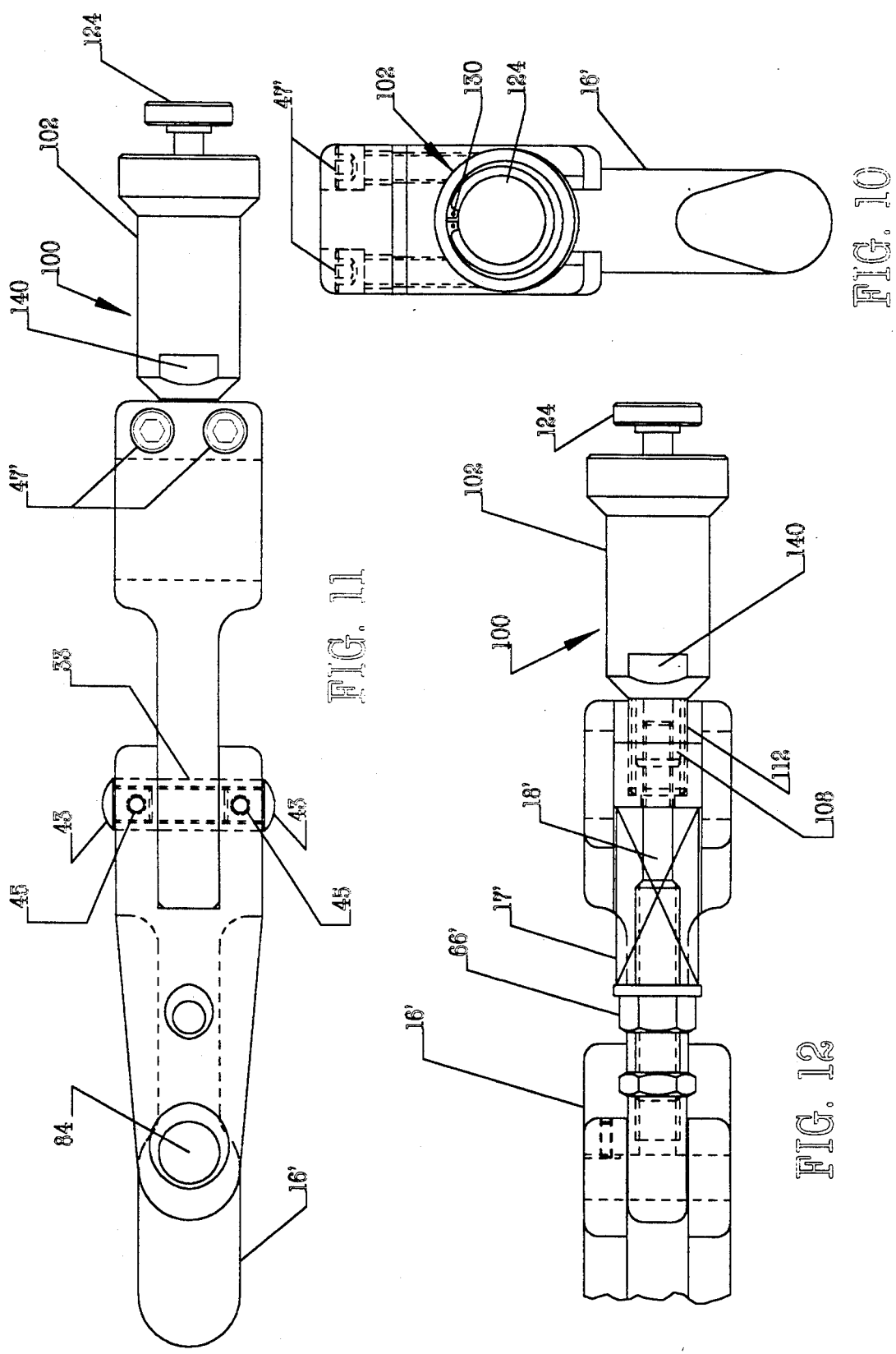

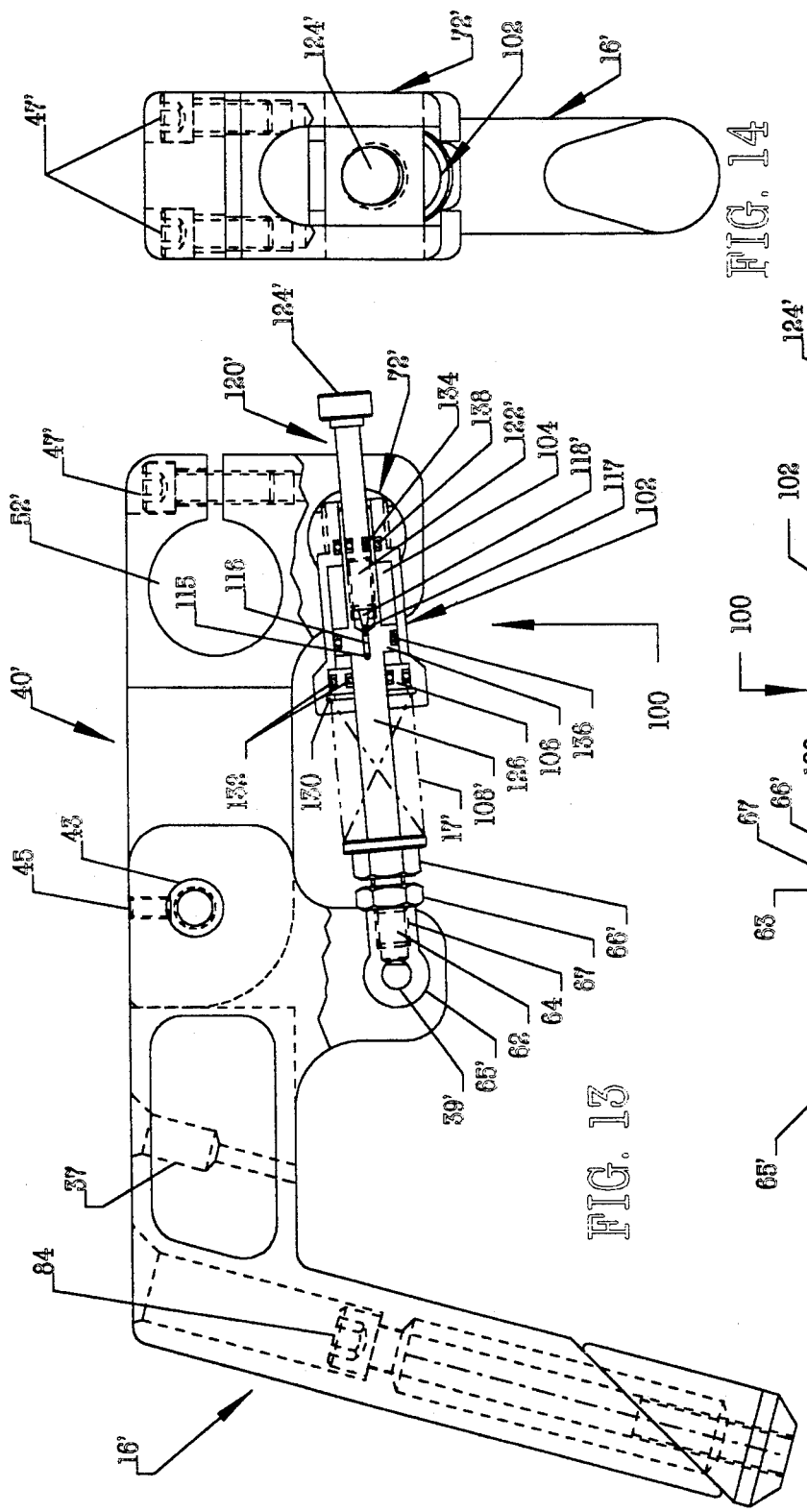

BICYCLE HANDLEBAR SHOCK ABSORBER

BACKGROUND OF THE INVENTION

1. Field of the Invention

This invention relates to vehicles incorporating a handlebar steering arrangement and, more particularly, to vehicles such as bicycles in which the handlebars serve to provide partial support to the rider.

2. Description of the Related Art

The history of the bicycle goes back nearly 200 years; pedal operated bicycles, about 150 years. Variations of the current design have been in use for approximately 100 years, the main features of which are two medium sized wheels of approximately equal diameter, a chain drive to the rear wheel, rubber tires and wire spoke wheels. The frames are formed of thin tubing arranged in a diamond or triangulated design in which all tubes are subject to compression forces only so that lightweight tubing can be used.

Throughout much of its history, the bicycle has been used, both as a means of transportation and for sport and recreation, on paved roads or other relatively smooth surfaces. In the main, the commonly adopted spring support of the bicycle seat, coupled with the resilience afforded by pneumatic rubber tires, has provided sufficient resiliency to make the transmission of roadway shocks acceptable to the rider. From time to time efforts at improving the springiness of the bicycle have been proposed. These have taken the form of shock absorbers in the front fork and frame member, in the seat post, and in the rear suspension. There have also been various arrangements proposed to alleviate the rigidity of the support mounting of the front handlebar, since this is particularly related to the ability of the rider to control the bicycle, particularly over uneven terrain.

One of the earliest known arrangements for absorbing jars and shocks communicated to the handlebar of a bicycle during riding movement is disclosed in U.S. Pat. No. 583,483 of Kellogg, which discloses a spring within the post extending upward from the front fork in which the handlebar is pivotably mounted. This spring biased the mounting pivot so that some rotation of the handlebar about the pivot axis was permitted when shocks were encountered. An adjusting bolt permitted variation in the compression of the spring so that the softness of the ride might be controlled. Similar spring and pivoting arrangements for handlebar support mechanisms for use in bicycles, motorcycles and the like are disclosed in U.S. Pat. Nos. 1,468,835 of Rosen and 1,616,021 of Arzens.

E. K. Kuhn, in U.S. Pat. Nos. 1,640,454 and 2,324,403, discloses spring support arrangements for pivotable mounted handlebars of bicycles, motorcycles and the like in which a plurality of springs are used to provide the resilient support. In the arrangement of the later patent, Kuhn also incorporates a number of linkages coupled at a plurality of pivot points to provide resilient handlebar support in both upward and downward displacement from a rest position. In addition to being cumbersome and relatively costly to manufacture, these arrangements appear to present problems in maintaining proper stem alignment during negotiation of uneven terrain.

U.S. Pat. No. 1,183,389 of MacLean discloses a shock absorber for motorcycle handlebars in the form of a parallel bar linkage arrangement including a pair of helical springs mounted in compression between the ends of different arms of the linkages conceptually resembling somewhat the arrangement of the later Kuhn patent. In the MacLean arrangement, the handlebar support pivot element is completely separate from the stem extending to the front fork, being held together therewith by the shock absorber linkage. Like Kuhn, this arrangement is considered to be subject to substantial instability in stem alignment and steering control, in addition to adding weight and complexity which is unacceptable in a lightweight vehicle such as a bicycle.

Another adjustable shock absorbing handlebar structure which is particularly adapted for use on motorcycles employed in racing over rough and uneven terrain is disclosed in the Finkle U.S. Pat. No. 4,420,989. This uses an unconventional handlebar structure comprising parallel linkages extending from the handle grip members to a central structure which is attached to the fork. The grips and angulation of these parallel linkages are manually adjustable. The central portion of this arrangement contains a combination of resilient pads and a fluid-containing shock absorber which controls the pivoting of the parallel bar linkages and thereby the resilience of the grip members. This appears to be clearly unsuited for incorporation in a lightweight bicycle.

Still another adjustable shock absorbing handlebar structure, which has been marketed commercially, incorporates a two-piece gooseneck, comprising a base member that clamps to the stem extending upwardly from the front forks of the bicycle and a knuckle member that clamps to the handlebars. These two members are pivotably joined by a knuckle pivot pin. An offset spring support member in the form of a threaded rod with an adjustable retaining arrangement for a compression spring extends between the base and knuckle parts of the assembly. The rod has an eye portion which is pivotably mounted to an offset portion of the base. The other end of the rod couples to an offset portion of the knuckle in an arrangement which permits relative rotational and longitudinal movement between the two offset portions. This end of the rod also supports the compression spring which bears against the knuckle to bias the handlebar mounting to an upper rest position. The connections of the base and knuckle members to the rod and spring could be interchanged, if desired. Downward force against the handlebars, as when the rider encounters a bump at the front wheel, serves to compress the spring and pivot the handlebar mount downward, thus cushioning the bump and absorbing much of the shock which would otherwise be transmitted directly to the rider's arms and shoulders.

An article by Doug Roose entitled "Bicycle Suspensions," *Bicycle Guide*, August, 1988, pages 75–79, discusses the various problems of providing resilient support in bicycles which are subject to moderate to severe road vibrations and shock, such as may be encountered in off-road racing and BMX competition. Proposed solutions include resilient suspension arrangements for the front fork and the rear portion of the frame and a so-called shock stem for handlebar suspension which utilizes a block of rubber for cushioning. Further details regarding the construction of the shock absorbing handlebar stem are not disclosed.

In the past decade or two, off-road bicycle riding has become more popular as a recreational sport. The advent of production of the so-called "mountain bike", which is a beefed-up version of the bicycle design which was in common use before the trend to ultra-lightweight, thin-tired, multi-speed bicycles developed, with large balloon tires and reduced sprocket ratios in the propulsion system. The riding of such bicycles on mountain trails, particularly in a downhill run, requires precise steering control of the front wheel from the handlebar for safe riding. This requirement is intolerant of any "slop" or play in the types of support structure between the handlebar and the front wheel such as are presented by a number of the shock absorbing arrangements of the patents discussed hereinabove.

SUMMARY OF THE INVENTION

In brief, arrangements in accordance with the present invention comprise a simple pivoted, spring-supported structure which is interposed between the conventional bicycle stem and the conventional handlebar and which incorporates an adjustable hydraulic element to control the stiffness of the shock absorber arrangement of the invention and to damp the movement of the spring-supported structure. As such, it may be readily used in retrofitting conventional bicycles of any type from off-road types such as BMXs to the more popular 10- to 15-speed bicycles and cruisers.

The disclosed embodiments of my invention comprise a parallel linkage arrangement pivotably secured to a stem member which is adapted to mount on the bicycle stem which extends upwardly from the front steering fork. The upper one of the link members of the parallel linkage is somewhat L-shaped and turned on its side. The upper end of the ell is pivotably attached to the stem member. The bottom portion of the ell, in line with the pivot point, has an adjustable opening for receiving and mounting the handlebar therein. The other link member is a threaded eye rod which is slidably positioned in a second opening in the bottom of the ell, oriented transversely to the handlebar opening. This eye rod has a compression spring positioned thereon and bearing against a support surface on the lower portion of the ell remote from the handlebar opening. The eye end of the rod is pivotably mounted to the stem member.

A hydraulic piston-and-cylinder combination is threaded into the opening in the lower part of the ell in line with the eye rod. The end of the eye rod is threaded into a bore in a first shaft extending from one side of the piston. A hollow guide shaft extends from the other side of the piston, guided by a bore in the end of the cylinder which is remote from the eye rod pivot point. A metering screw having an external, accessible thumb wheel is threadably positioned within the hollow guide shaft.

The piston is provided with a central opening communicating with portions of the cylinder on opposite sides of the piston, thereby providing a fluid passage from one side of the piston to the other. The metering rod has a tapered, pointed end which can be moved into or out of the central opening to vary the size of the piston orifice, thereby regulating the fluid flow from one side of the piston to the other. O-rings are provided at points where sealing is required for relatively sliding surfaces.

Two different embodiments of the described arrangement of the invention are disclosed. In one, the cylinder shock absorber is mounted forward of the parallel linkage. In the other, the cylinder is mounted within the linkage, extending aft from the bottom portion of the ell between the compression spring and the ell.

Arrangements in accordance with the present invention permit a finer adjustment of the ride stiffness than has heretofore been possible with known prior art shock absorbing arrangements. The shock absorber action of the piston in the cylinder complements the shock absorbing effect of the compression spring which is mounted on the eye rod. Furthermore, the adjustment of the metering screw provides a readily accessible means of adjusting ride stiffness without the rider having to dismount to make particular adjustments.

Because of the construction of arrangements in accordance with the present invention, wherein the only pivoting occurs about a central pivot pin which is transverse to the line of the two-piece gooseneck, no tolerance or side play is introduced in the alignment of the steering arrangement which extends from the handlebar to the front wheel about the axis of the front fork. Thus, bicycles incorporating the handlebar shock absorbing arrangements of the present invention are as stable as fixed steering arrangements which employ a conventional rigid gooseneck. However, tests have demonstrated the improved steering control of bicycles incorporating the present invention on speed runs over rough, mountain-type, off-road terrain.

BRIEF DESCRIPTION OF THE DRAWING

A better understanding of the present invention may be realized from a consideration of the following detailed description, taken in conjunction with the accompanying drawing in which:

FIG. 10 is a right end view of the apparatus of FIG. 9;

FIG. 11 is a top view of the apparatus of FIG. 9;

FIG. 12 is a bottom view, partially broken away, of the apparatus of FIG. 9;

FIG. 13 is a side elevational view of another particular arrangement in accordance with the present invention;

FIG. 14 is a right end view of the arrangement of FIG. 13; and

FIG. 15 is a partial bottom view of the arrangement of FIG. 13.

DESCRIPTION OF THE PREFERRED EMBODIMENTS

Figure 1:
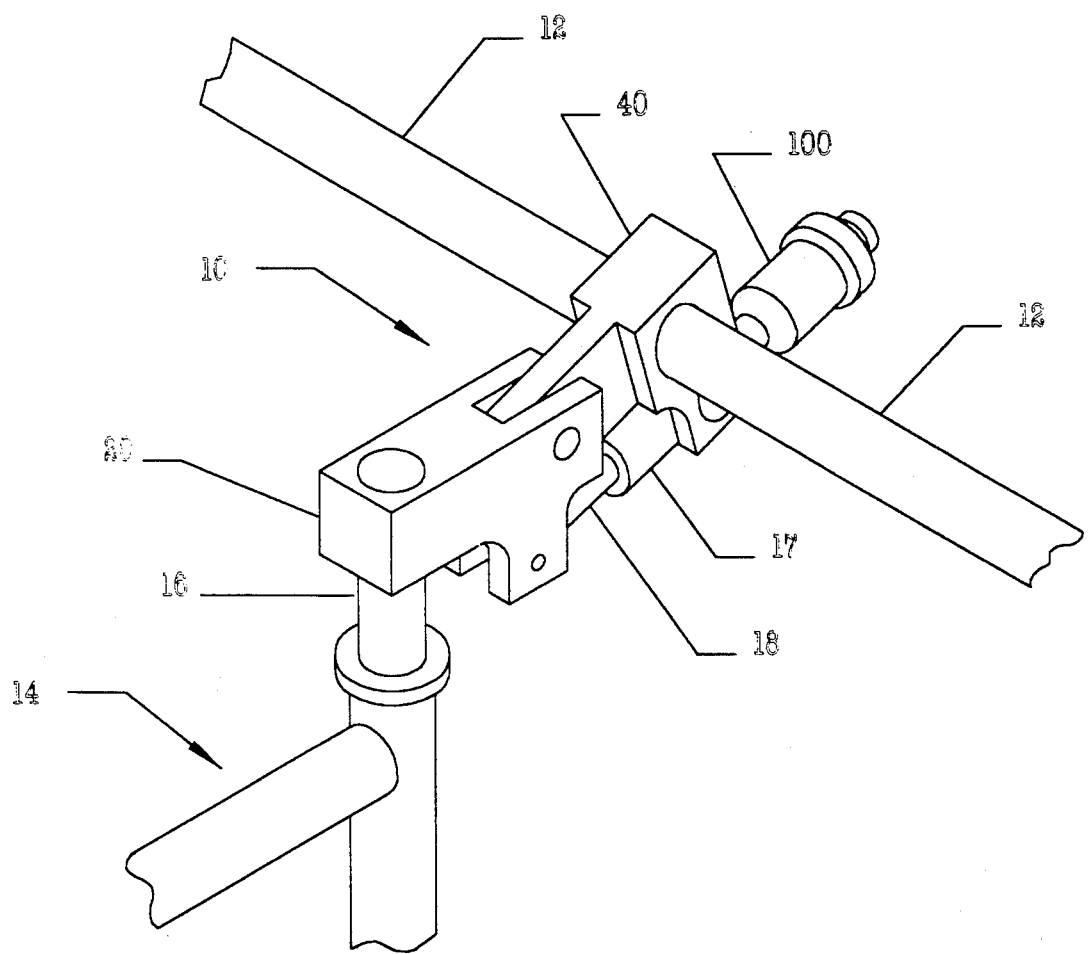
FIG. 1 is a partial perspective view of a bicycle showing the installation of an arrangement in accordance with the invention.

As indicated in the partial view of a bicycle having an arrangement in accordance with the present invention installed, as depicted in FIG. 1, the shock absorber arrangement 10 comprises a base member 20 affixed to the stem 16 which is rotatably mounted in the front frame 14 of a bicycle. The stem 16 is conventionally affixed to the steering fork (not shown). A knuckle member 40 is pivotably attached to the base 20 and has a handlebar 12 clamped therein. A piston/cylinder shock absorber 100 is shown coupled to the knuckle member 40. A resilient support mechanism comprising a spring 17 mounted on an eye rod 18 extends between respective lower portions of the base 20 and knuckle 40. Details of this construction are better shown in the assembly drawing of FIG. 7 and in the individual part drawings of FIGS. 2-6.

Figure 2:
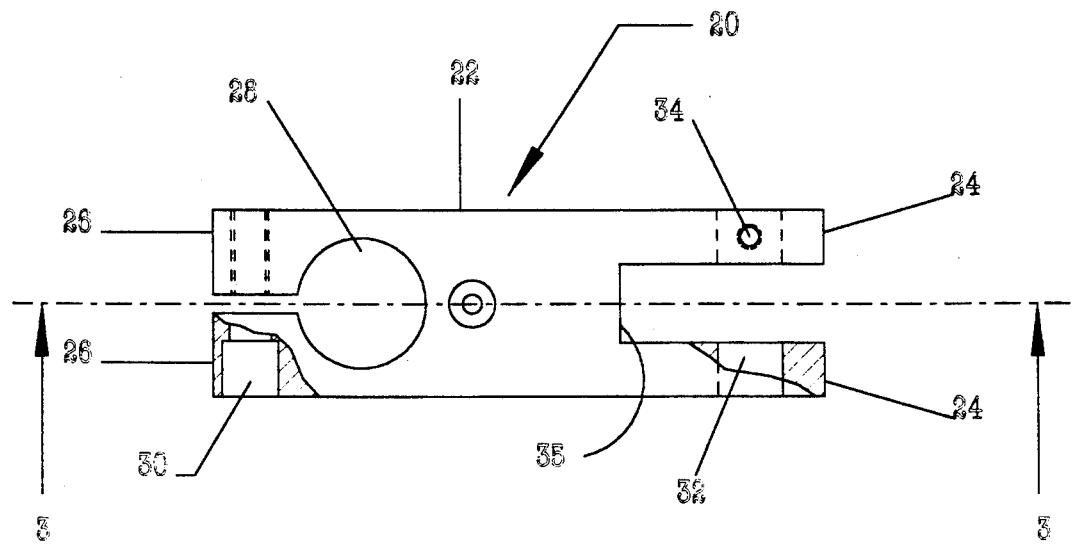
FIG. 2 is a plan view, partially broken away, of the base member of the arrangement of FIG. 1.
Figure 3:
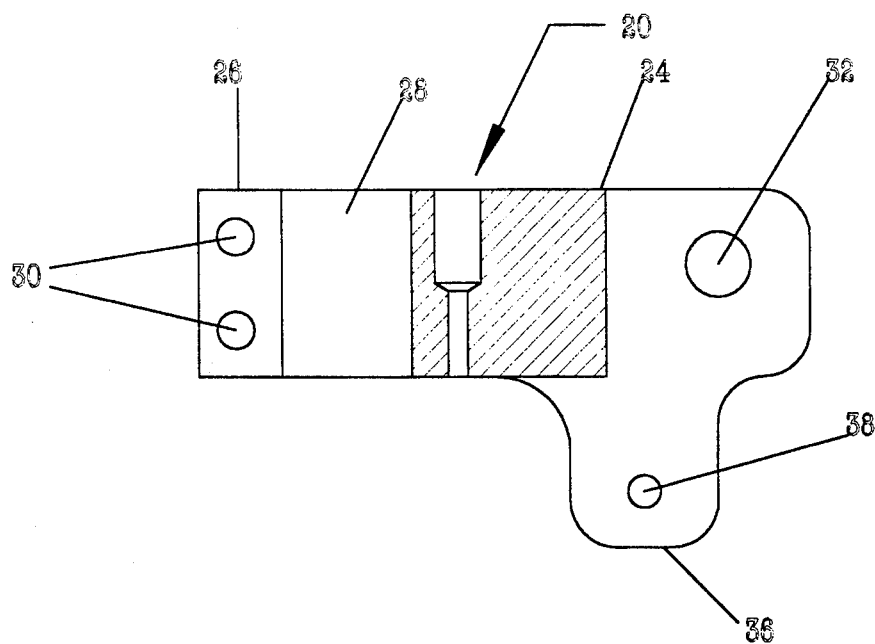
FIG. 3 is a side sectional view, taken along the lines 3-3 of FIG. 2.
Figure 7:
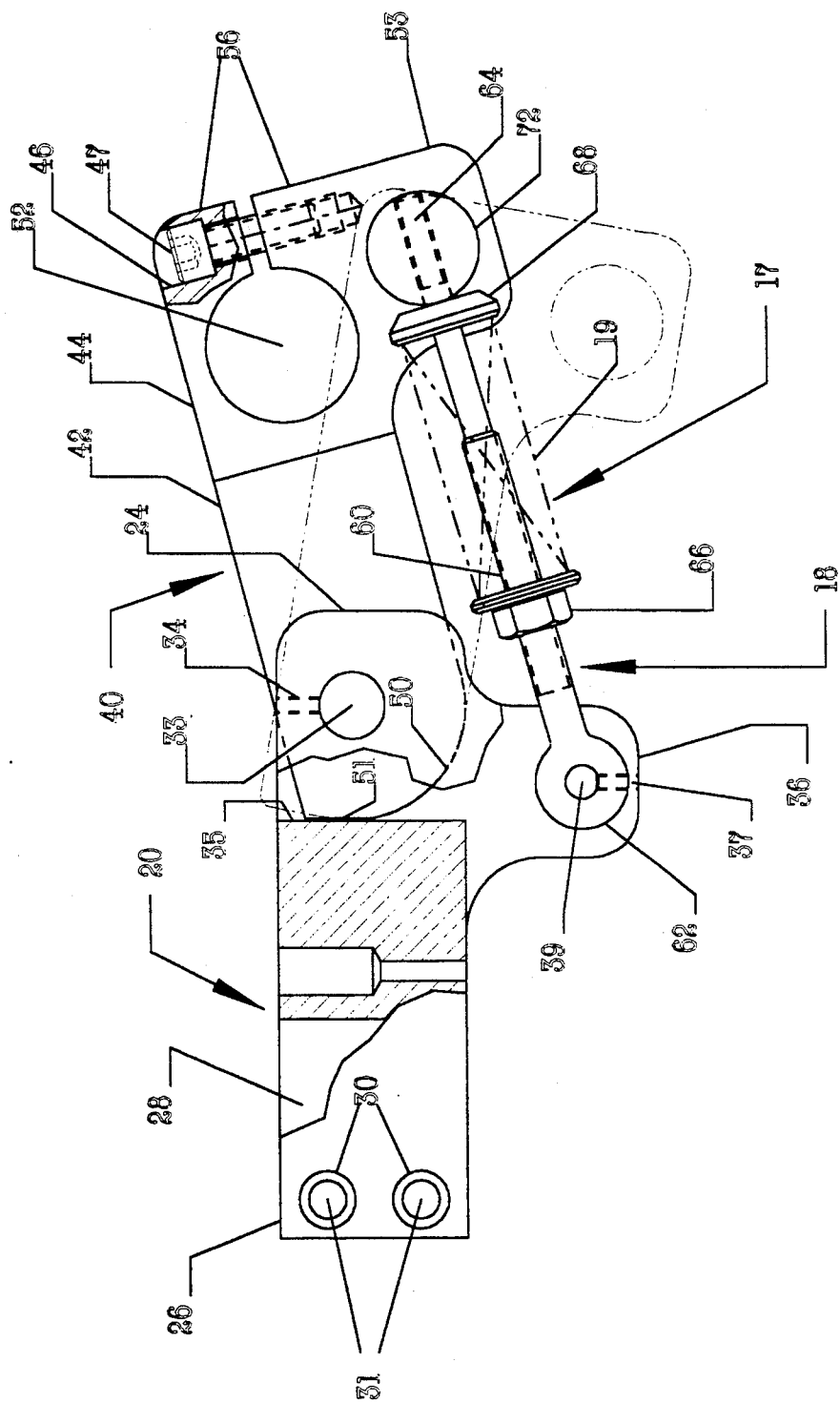
FIG. 7 is an assembly drawing, partially broken away and partly in phantom, showing two positions of the arrangement of FIG. 1, without the piston/cylinder portion of the shock absorber.

FIGS. 2 and 3 are respectively plan and side elevational views of the base member 20. FIG. 3 is a sectional view taken along the line 3—3 of FIG. 2, looking in the direction of the arrows. The base 20 comprises a block 22 which is split at one end to form a pair of arms 24 on opposite sides of a flat face 35, each of which contains a transverse bore 32 for receiving a knuckle pivot pin 33 which pivotably secures the end of the knuckle 40 when the arrangement 10 is assembled. A circular opening 28 is provided between jaws 26 to receive the upper end of the stem 16, and threaded bore holes 30 are provided to receive cap screws 31 to draw the jaws 26 together, thus clamping the base member 20 to the stem 16. The numeral 34 designates a set screw extending into one of the arms 24 to retain the knuckle pivot pin 33 in position. Each of the arms 24 has an offset, downwardly extending portion 36 with a bore 38 for receiving another pivot pin 39 for mounting the rod 18 (FIG. 7).

Figure 4:
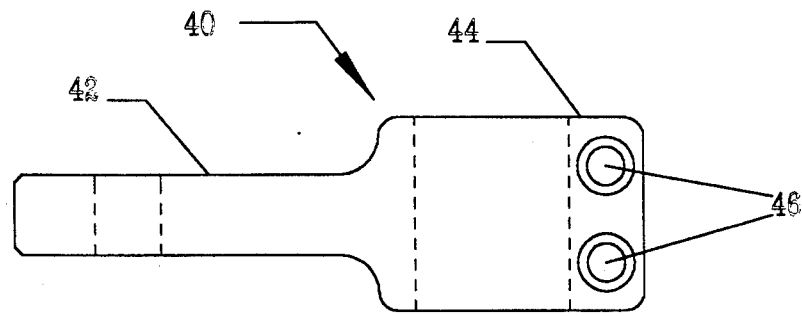
FIG. 4 is a plan view of the knuckle member of FIG. 1.
Figure 5:
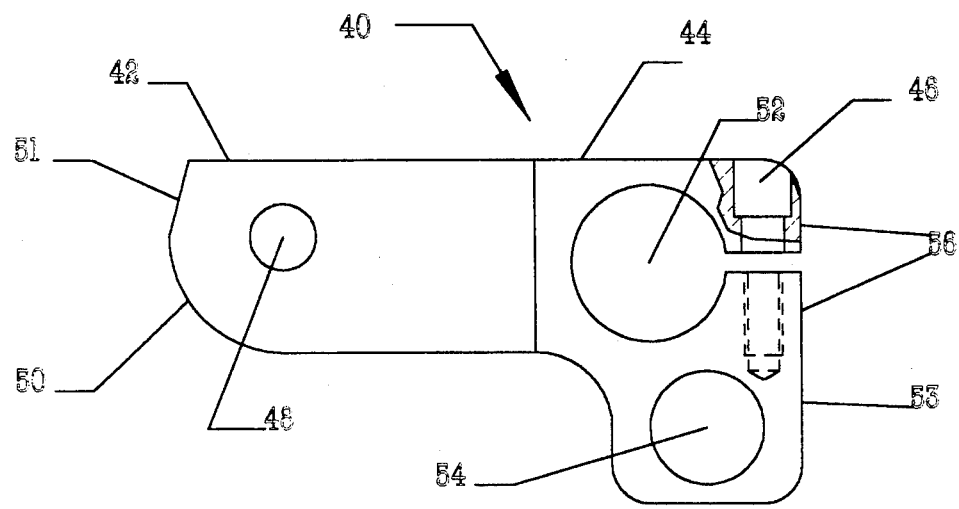
FIG. 5 is a side elevation, partially broken away, of the knuckle member of FIG. 4.
Figure 6:
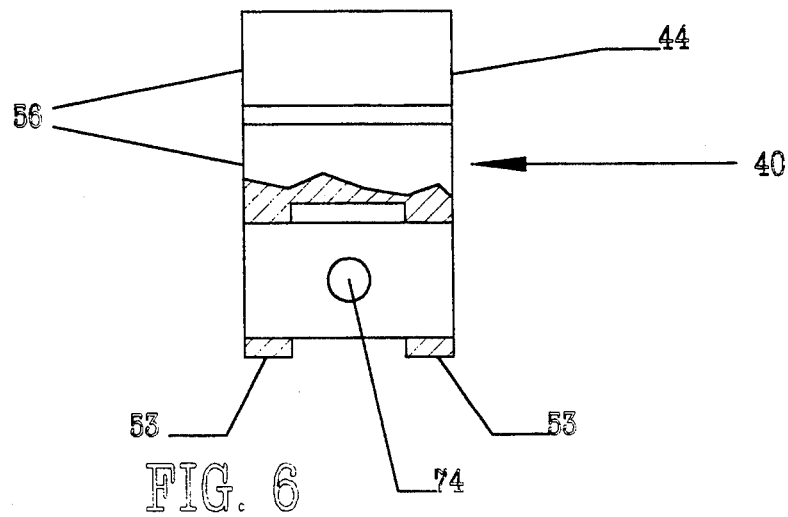
FIG. 6 is an end view, partially broken away, of the knuckle member of FIG. 4.

The knuckle 40 is shown in FIGS. 4-6 as having a block portion 44 and a narrow tongue portion 42 which is adapted to fit between the arms 24 of the base 20 in a pivoting arrangement retained by the knuckle pivot pin 33 extending through the bore 48. The tongue portion 42 terminates in a curved end 50 and a flat, planar surface 51. The block portion 44 includes a bore 52 for receiving the mounting portion of the handlebars 12 and a pair of jaws 56 which are tightened by cap screws 47 in the threaded bore holes 46. The block portion 44 further comprises an offset, downwardly extending portion 53 having a transverse bore 54 for receiving a rod guide 72. The rod guide 72 has a central transverse bore 74 for receiving the free end of the rod 18. The guide 72 is permitted to rotate within the bore 54 as constrained by the free end of the rod 18 during pivoting of the knuckle 40 relative to the base 20 in use.

The remainder of the items making up the assembly 10 are shown, except for the hydraulic shock absorber portion 100 which is shown in FIGS. 9-12. FIG. 7 shows the eye rod 18, having an eye portion 62 at one end, a central threaded portion 60 and a lesser diameter threaded end 64. The eye portion end of the rod 18 is held in place by the pivot pin 39 extending through the eye 62 and into the two arms 24 of the base 20. A set screw 37 holds the pin 39 in place. The other end 64 is mounted for sliding movement within the bore 74 of the rod guide 72. A spiral compression spring 17, indicated by the two parallel lines 19 in FIG. 7, extends between a spring retainer 68 and a spring collar nut 66, the latter being threaded on the threaded portion 60 of the rod 18 while the spring retainer 68 bears against the rod guide 72 and is slidable along the unthreaded end portion 64.

The handlebar shock absorbing arrangement of the assembly of FIGS. 1-7 is adjustable in order to accommodate differences in course and terrain, different riders, different machines and the like. Thus, the nut 66 may be located to different points along the threaded portion 60 of the rod 18 in order to vary the biasing force of the compression spring 17 or to accommodate the use of springs 17 of different lengths. Moreover, the mounting arrangement for the rod and spring mechanism is readily disassembleable to permit the substitution of different springs 17. This can be accomplished merely by loosening the set screw 37 and sliding the rod pivot pin 39 transversely until the eye portion 62 is free. The rod 18 can then be slipped out of the bore 74 in the rod guide 72 and the spring retainer 68 removed to permit removal of the spring 17 and replacement with another providing the compression force which is desired. The unit is then reassembled and ready to use in a matter of minutes and without having to disassemble the attachment to the bicycle stem or handlebar.

In operation, and without any downward force being applied to the handlebar 12, relative to the bicycle stem 16, the shock absorber assembly 10 is in the configuration indicated by the solid outlines of the assembled parts as shown in FIG. 7. The knuckle 40 is urged to its uppermost, counterclockwise, position relative to the base 20 with the flat 51 on the end 50 of the knuckle 40 against the mating surface 35 of the base 20. The spring 17 is in its extended position with the rod end 64 retracted relative to the rod guide 72.

Downward force applied to the handlebars 12 relative to the bicycle stem 16 and the attached base 20, as when the bicycle encounters a bump in the road, forces the outer end of the knuckle 40 downward, pivoting about the knuckle pivot pin 33. As the knuckle 40 rotates clockwise about the pin 33, the distance between the two offset portions 36, 53 is reduced, moving the spring retainer 68 along the rod 18 and compressing the spring 17. As this action occurs, the end 64 of the rod 18 moves longitudinally in the bore 74 of the guide 72, as shown in the phantom view portion of FIG. 7. The resulting resilient movement of the handlebar 12 provides the desired shock absorbing effect when encountering bumps in terrain being traversed by the bicycle and thus significantly relieves the strain and reduces the shock imparted to the arms and upper body of the rider. Because of the improved design of this arrangement, wherein there is no free play whatsoever in any of the parts which extend between the bicycle stem and handlebar, there is no sacrifice of lateral stability of the bicycle steering system. The overall result is an improvement in control capability for bicycles equipped with these shock absorber arrangements when maneuvering at speed over uneven terrain, downhill off-road courses, and the like.

Figure 8:
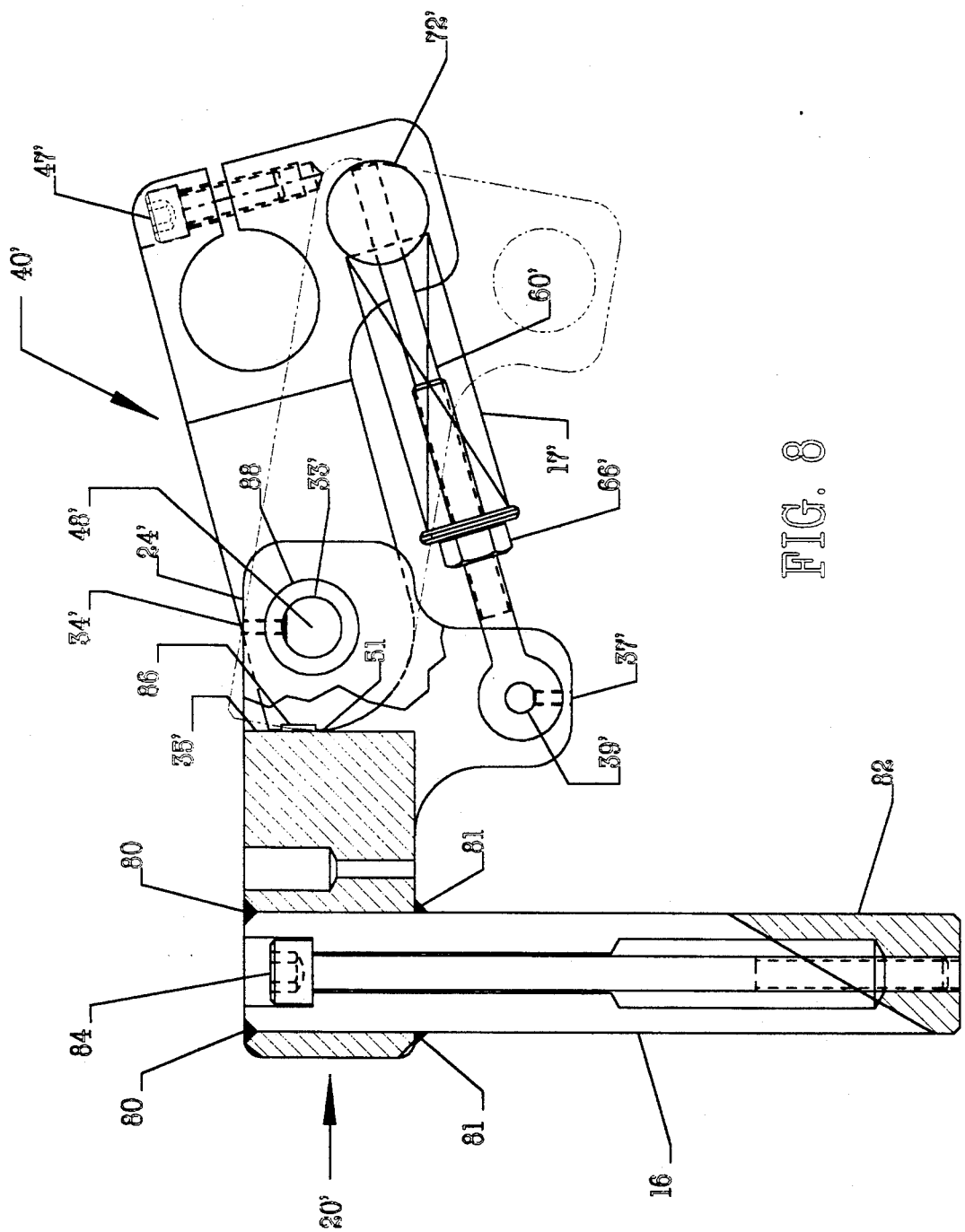
FIG. 8 is a drawing like FIG. 7, showing a variation of the arrangement of FIG. 7.

A variation of the shock absorber of FIG. 7 is illustrated in FIG. 8. This structure is much like that of FIG. 7, and the same reference numerals are used for like parts, with the addition of the prime superscript to the numeral.

The base 20' differs from the base 20 (FIG. 7) in the manner in which it is mounted on the bicycle stem 16. In the arrangement of FIG. 8, the base 20' is not split to permit tightening on the upper end of the stem; rather the block 20' is welded to the upper end of the stem 16 at upper and lower weld points 80, 81. A conventional stem bushing 82 is shown at the lower end of the stem 16, adapted for lateral displacement relative to the stem 16 by the tightening of a stem bolt 84 extending through a mating bore in the base 20. This construction makes for a somewhat stronger attachment between base and stem, and also makes it easier to retrofit the shock absorber apparatus to existing vehicles and to change from one shock absorber apparatus to another.

Another modification resides in the Teflon butt element 86 which is mounted within a recess along the face 51' of the knuckle 40'. This provides a slight cushioning effect between the face 51' of the knuckle 40' and the flat face portion 35' of the base 20' when the shock absorber apparatus is in the extended position. In the embodiment of FIG. 8, all corners of the various parts have been radiused and the spring retainer 68 of FIG. 7 has been dispensed with. The biasing spring 17' bears directly against the rod guide 72'. In addition, the bore 48' of the knuckle 40' is enlarged to receive and mount a press fitted reamer bushing 88 in which the knuckle pivot pin 33' is installed. This provides a better fit with longer wear for the rotational members 33' and 88.

First Preferred Embodiment—FIGS. 9-12

Figure 9:
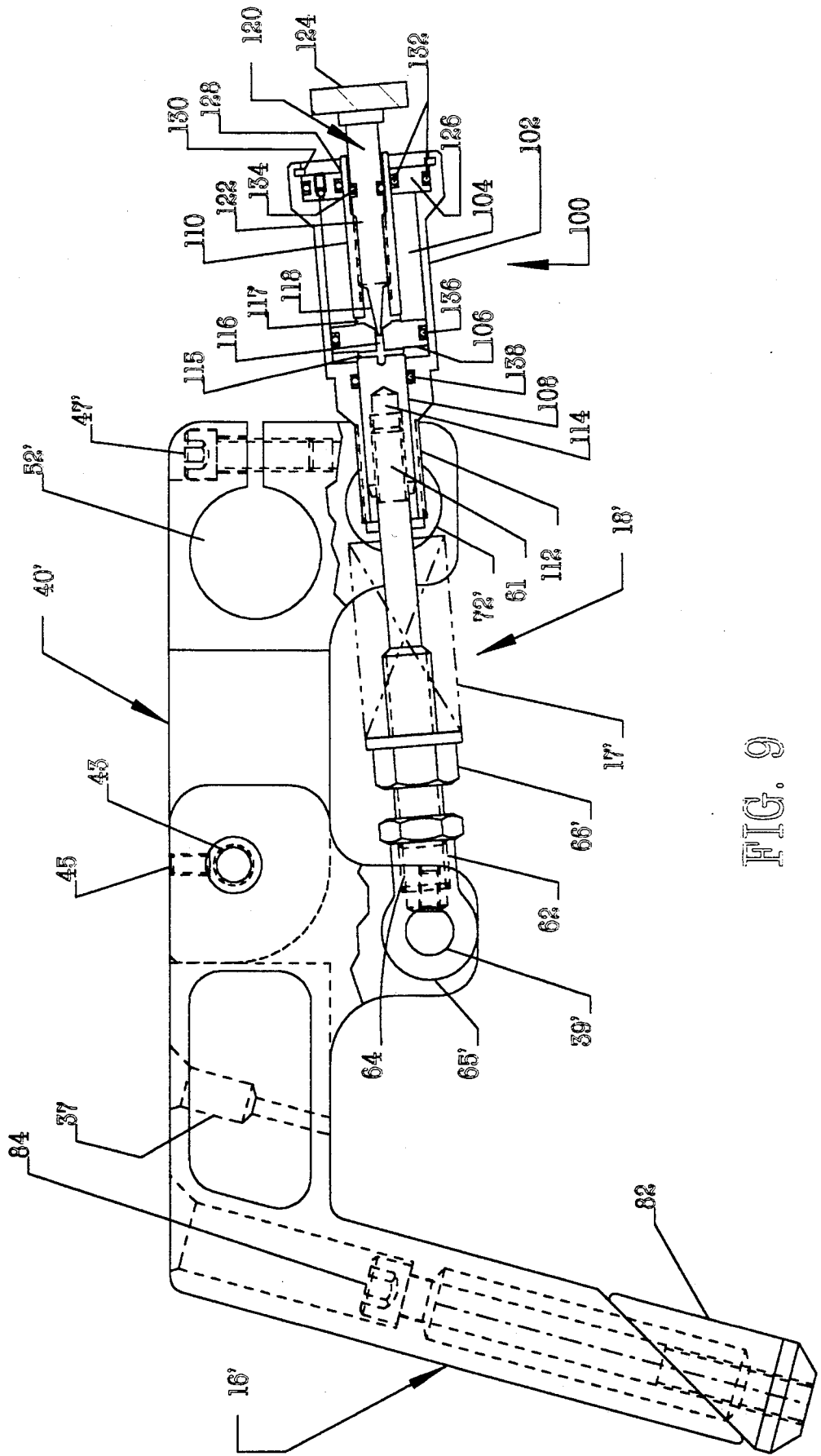
FIG. 9 is a side elevational view, partially broken away, of one particular arrangement of the combination shock absorber of my invention.

FIGS. 9-12 show the structural details of the overall combination with the hydraulic piston/cylinder element 100 added to the structure of FIG. 8. The mechanical shock absorber portion of the assembly depicted in FIG. 9 is essentially like that depicted in FIG. 8 with the exception that it has been redesigned into a one piece stem unit 16' to take the place of the two-piece stem 16 and block 20' which are welded together in the FIG. 8 arrangement.

In FIG. 9, reference numeral 37 designates a retention bore for a brake cable. As seen in FIG. 11, the knuckle pivot pin 33 is a threaded sleeve which is held in place by a pair of opposed buttonhead screws 43, fixed by set screws 45.

The shock absorber element 100 is shown in FIGS. 9-12 as comprising a body 102 defining a cylinder 104 in which a piston 106 is mounted for slidable movement therein. The piston 106 has hollow threaded shafts 108 and 110 extending from opposite sides of the piston. An extension 112 of the body 102 supports the shaft 108 and is threaded into a mating bore in the transverse rod guide 72'. The remote, or distal, end 61 of the rod 18' is threaded into the bore 114 of the shaft 108. Thus, the piston 106 is driven by any sliding movement of the rod 18' within the rod guide 72'. The proximal end 62 of the rod 18' is threaded into a bore 64 in the rod end member 65 which provides the opening by which the rod 18' is retained on the pin 39'.

A metering rod 120 having a central threaded portion 122 is threaded into a mating bore of the hollow shaft 110. The piston 106 has a central orifice 116 which provides a communication passage between sets of ports 115, 117 on opposite sides of the piston 106. The flow of oil through this orifice is controlled by the metering rod 120 which has a tapered end portion 118 extending into the orifice 116. A knurled head or knob 124 on the metering rod 120 is provided for adjusting the position of the metering rod within the shaft 110, relative to the piston orifice 116. An end cap 126 having a central guide bore 128 for the shaft 110 is held in position at the end of the body 102 by a snap ring 130 retained in a corresponding circumferential slot. A pair of O-ring seals 132 is installed within the end cap 126. Another 0-ring 134 is positioned on the metering rod 120. The piston 106 is provided with an O-ring seal 136 while another O-ring seal 138 is positioned within the body 102 about the shaft 108. As seen in FIGS. 11 and 12, opposed wrench flats 140 are formed on the body 102 for installing and removing the fluid shock absorber 100.

Second Preferred Embodiment—FIGS. 13-15

In the embodiment of the invention schematically represented in FIGS. 13-15, the combination is essentially the same as the arrangement of FIGS. 9-12 with the exception that the element 100 is inverted relative to its orientation in FIGS. 9-12. The metering rod 120' is also reversed relative to the element 100 so that the position of the knurled head 124' is still the same relative to the bicycle handlebar. That is, the knurled head 124' is still accessible to the rider in essentially the same position so that he can accomplish the desired adjustment of the fluid shock absorber element 100 by simply reaching forward over the handlebar and manipulating the knurled head at the same location as in the arrangement of FIGS. 9-12. In both embodiments, the cylinder body 102 is filled with 15 weight Bel Ray fork oil or equivalent.

The eye rod 18' of FIG. 9 is eliminated as such in the embodiment of FIGS. 13-15. Shaft 108' of the piston 106 is substantially longer than the shaft 108 of FIG. 9 and is threaded externally along its end portion 62, rather than along an internal bore as in FIG. 9. The end 62 is threaded into a bore 64 of the end member 65 and is locked against rotation by locking nut 67. In essentially all other respects, the structural components of the second embodiment are the same as in the first embodiment. The cylinder body 102 and its component parts are the same. The piston 106 and its shafts are reversed relative to the cylinder body 102 but the operation and control, with the adjustable metering rod extending forward to an accessible thumb wheel, are the same.

In operation, the mechanical portion of the embodiments of the invention shown in FIGS. 9-12 and in FIGS. 13-15 performs as described hereinabove for the arrangement of FIG. 7. The compression spring 17' can be changed for different types of terrain by removing the pivot pin 39' and swinging the shaft assembly downward about the transverse rod guide 72'. The rod end 65' and the jam nuts 66', 67 are then removed so that the compression spring 17' may be slipped off the shaft assembly and replaced with a new spring of the desired biasing rate. Obviously, this cannot be accomplished while the bicycle is being ridden.

With the addition of the fluid shock absorber element 100, adjustment of shock absorber stiffness "on the fly" becomes possible and is a simple matter to accomplish. The rider simply reaches forward to the knurled head 124 and turns it in the direction appropriate to accomplish the change in shock absorber stiffness which is desired. The same shock absorber element 100 can be used to provide a range of adjustment with whichever compression spring 17' is installed in the shock absorber system 10 at a given time. The result is a multi-level shock absorber combination, one being mechanical and fixed for a given compression spring but variable through the substitution of different springs; the other being continuously variable on the fly over a range of stiffness which is specific for each different compression spring.

Although there have been described hereinabove specific arrangements of a bicycle handlebar shock absorber in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A handlebar shock absorber apparatus for a bicycle comprising:
    a base member for attachment to a front fork of the bicycle;
    a knuckle member for mounting to the bicycle handlebar;
    pivoting means coupling the base member and the knuckle member together to permit relative rotational movement about a transverse axis oriented in a first orthogonal direction;
    first and second offset means extending transversely from the base member and the knuckle member, respectively, in a second orthogonal direction;
    a transverse guide member pivotably mounted within the second offset means of the knuckle member and oriented in said first direction;
    resilient support means pivotably coupled to the base member at said first offset means and having a central rod member constrained by the transverse guide member to move longitudinally relative to the second offset means;
    shock absorber means comprising a body defining a cylinder, a transverse piston mounted for axial movement within said cylinder, and a quantity of fluid within the cylinder for limiting movement of the piston, the body having an extended portion with means for mounting the body to said guide member;
    a pair of hollow threaded shafts extending axially from opposite sides of the piston, the first of said pair being coupled to the central rod member for longitudinal movement therewith;
    means defining at least one passage extending from one side of the piston to the other within the body; and
    control means for selectively restricting said passage, thereby limiting the flow of fluid from one side of the piston to the other and developing additional shock absorbing action for the resilient support means in order to control the extent of rotational movement of the knuckle member relative to the base member in response to shock forces from uneven terrain encountered while the bicycle is in use.

2. The apparatus of claim 1 wherein said passage comprises a central orifice extending through the piston and communicating with transverse ports in each of said shafts.

3. The apparatus of claim 2 wherein said control means comprise a metering rod having a tapered end portion extending into said orifice to adjust an effective size of the orifice.

4. The apparatus of claim 3 further including means for threadably engaging said metering rod within the second of said pair of hollow threaded shafts for controlled axial positioning therein.

5. The apparatus of claim 4 including means for orienting said metering rod to extend beyond said knuckle member for ready access by the user of a bicycle.

6. The apparatus of claim 5 wherein said metering rod terminates at its outer end in a knurled knob to facilitate adjustment of the metering rod relative to the orifice.

7. The apparatus of claim 1 wherein said resilient support means is mounted between said first and second offset means, one end of the central rod member being pivotably coupled to a pivot pin extending transversely through the first offset means in said first orthogonal direction.

8. The apparatus of claim 7 wherein said central rod member comprises a rod end member having a threaded bore and an end defining an enclosed opening for engaging said pivot pin, and a threaded rod, a distal end of said rod being threaded into the first hollow threaded shaft and a proximal end being threaded into the bore of the rod end member.

9. The apparatus of claim 8 further including a locking nut adjustably threadable on the proximal end of said rod for fixing the extent of penetration of the proximal end into the bore of the rod end member.

10. The apparatus of claim 8 wherein the resilient support means further includes a compression spring encircling and extending along the rod and an adjustable spring retainer threadably engaged on said rod and adjustable along the rod to vary a compression force of the spring.

11. The apparatus of claim 10 wherein said body further includes an end cap for closing said cylinder, said cap including central guide means for guiding and aligning the threaded shaft in which the metering rod is mounted.

12. The apparatus of claim including means for installing said shock absorber means to extend outboard of the second offset means of said knuckle member.

13. The apparatus of claim 1 including means for installing said shock absorber means to extend inwardly from said second offset means along said resilient support means.

14. The apparatus of claim 6 wherein said metering rod extends outwardly from said shock absorber means in a direction away from an first offset means, the adjusting knob of the metering rod being situated outboard of the second offset means of the knuckle member.

15. The apparatus of claim 1 wherein said means for mounting the body to the guide member includes means for mounting the body to extend outwardly of the knuckle member in a direction away from said resilient support means.

16. The apparatus of claim 10 wherein an end of said compression spring remote from the adjustable retainer is positioned to bear against the extended portion of said body.

17. The apparatus of claim 10 wherein an end of the compression spring remote from the adjustable spring retainer is positioned to bear against an end of said body remote from said extended portion.

* * * * *